United States Patent [19]

Shiraishi et al.

[11] Patent Number: 5,267,078

[45] Date of Patent: Nov. 30, 1993

[54] OPTICAL ISOLATOR

[75] Inventors: Kazuo Shiraishi, Kimachidori 1-8-1-804, Aoba-ku, Sendai-shi, Miyagi-ken; Kazuhiro Nakajima; Yasuo Numajiri, both of Tokyo, all of Japan

[73] Assignees: Kazuo Shiraishi, Miyagi; Sumitomo Metal Mining Co., Ltd., Tokyo, both of Japan

[21] Appl. No.: 931,566

[22] Filed: Aug. 18, 1992

Related U.S. Application Data

[63] Continuation of Ser. No. 809,707, Dec. 17, 1991, abandoned.

Foreign Application Priority Data

| Dec. 20, 1990 | [JP] | Japan | 2-412278 |
| Feb. 15, 1991 | [JP] | Japan | 3-043027 |
| Apr. 25, 1991 | [JP] | Japan | 3-095266 |
| Apr. 25, 1991 | [JP] | Japan | 3-095267 |
| Jun. 5, 1991 | [JP] | Japan | 3-134265 |
| Jun. 7, 1991 | [JP] | Japan | 3-136647 |
| Jun. 7, 1991 | [JP] | Japan | 3-136648 |

[51] Int. Cl.$^5$ ............ G02F 1/09; G02B 5/32; G02B 27/28
[52] U.S. Cl. .................. 359/282; 359/484; 359/494
[58] Field of Search ........... 359/281, 282, 283, 484, 359/494; 385/6, 11; 372/702

[56] References Cited

U.S. PATENT DOCUMENTS

| 4,178,073 | 12/1979 | Uchida et al. |  |
| 4,239,329 | 12/1980 | Matsumoto |  |
| 4,756,607 | 7/1988 | Watanabe et al. | 359/484 |
| 5,033,830 | 7/1991 | Jameson | 359/494 |
| 5,105,307 | 4/1992 | Nishiyama et al. | 359/484 |

FOREIGN PATENT DOCUMENTS

| 55-6326 | 1/1980 | Japan | 359/484 |
| 58-50512 | 3/1983 | Japan | 359/484 |
| 59-176721 | 10/1984 | Japan | 359/484 |
| 60-130934 | 7/1985 | Japan | 359/484 |
| 60-218619 | 10/1985 | Japan | 359/484 |
| 63-49728 | 3/1988 | Japan | 359/484 |

OTHER PUBLICATIONS

Shibukawa et al., "Compact Optical Isolator for Near-Infrared Radiation," *Electronics Letters*, vol. 13, No. 24, Nov. 24, 1977, pp. 721 to 722.

Emkey, "Analysis and Design of Optical Isolators," *First Microoptics Conference*, 1987, pp. 70 to 73.

*Primary Examiner*—Martin Lerner
*Attorney, Agent, or Firm*—Graham & James

[57] ABSTRACT

An optical isolator comprising an optical isolator unit having a structure depending on a plane of polarization of incident light, a first optical system for splitting the incident light into two polarized components for incidence on the optical isolator unit, and a second optical system for combining the two polarized components emerging from the optical isolator unit. The optical isolator can thus manifest an excellent effect of isolation without considering the plane of polarization of the incident light.

19 Claims, 5 Drawing Sheets

OPTICAL ISOLATOR

This is a continuation of copending application Ser. No. 07/809,707 filed on Dec. 17, 1991 now abandoned.

BACKGROUND OF THE INVENTION a) Field of the Invention:

This invention relates to an optical isolator and, more particularly, to a polarization-independent type optical isolator capable of functioning without consideration for a plane of polarization of incident light.

b) Description of the Prior Art:

FIG. 1 shows an example of the arrangement of a conventional optical isolator. This optical isolator is such that after incident light passes through a first polarizer 1, the plane of polarization of the incident light is rotated at angle of 45° by a Faraday rotator 2 and the incident light further passes through a second polarizer 3 which has the plane of polarization inclined at 45° with respect to the first polarizer. For return light reflected in a direction opposite to the incident light, on the other hand, only a component of the light which coincides in plane of polarization with the second polarizer 3 traverses the second polarizer 3 and then the plane of polarization thereof is further rotated at 45° by the Faraday rotator 2. It follows from this that the reflected return light which has traversed the Faraday rotator is such that the plane of polarization is rotated at 90° with respect to the first polarizer 1, and thereby the reflected return light cannot reach the entrance side of the incident light. Hence, according to the conventional optical isolator, the reflected return light in the opposite direction is blocked and the function of the optical isolator of this type is thus performed. Also, if the isolator of the arrangement depicted in FIG. 1 is constructed in a plural, a higher effect of isolation can be brought about.

With such a conventional optical isolator, however, there has been the problem that since it is required that the plane of polarization of the first polarizer 1 is kept to coincide with that of the incident light, the function cannot be effectively performed in a light transmission system such that in particular the plane of polarization cannot be specified.

SUMMARY OF THE INVENTION

It is, therefore, a primary object of the present invention to provide an optical isolator capable of properly functioning without taking the plane of polarization of incident light into consideration.

This object is accomplished, according to the present invention, by the arrangement that in an optical isolator unit having a structure depending on the plane of polarization of incident light, as shown in FIG. 1, a first optical system is disposed on its incidence side and a second optical system on its emergence side, in which the first optical system is constructed so that the incident light is split into two polarized components whose planes of polarization intersect perpendicular to each other and, by rotating one of the planes of polarization at 90°, the planes of polarization on components coincide with the plane of polarization on the incidence side of the optical isolator unit, while the second optical system is constructed so that the two polarized components which have passed through the optical isolator unit can be again synthesized.

According to one preferred formation of the present invention, the first and second optical systems each comprise the combination of an optical member which can split the incident light into two polarized components and can also synthesize the two polarized components, with a polarizing rotator. The polarizing rotator is inserted only in an optical path of one of the two polarized components split by the optical member. The optical isolator unit is such that an even number of optical isolator sets, each of which has the arrangement shown in FIG. 1, is connected in series. As the number of optical isolator units increases, the effect of isolation can be enhanced accordingly.

According to another preferred formation of the present invention, the optical isolator unit is constructed so that a plurality of optical isolator sets, each of which has the arrangement shown in FIG. 1, is disposed in series, the first optical system comprises an optical member capable of splitting the incident light into two polarized components and the polarizing rotator inserted only in the optical path of one of the two polarized components decomposed by the optical member, and the second optical system comprises a condenser lens. Between the optical isolator unit and the condenser lens, the polarizing rotator for turning the plane of polarization at 90° may be arranged in one of the optical paths of the two polarized light components.

According to still another preferred formation of the present invention, the optical isolator unit is constructed so that an even number of optical isolator blocks comprising a corresponding number of optical isolator sets, each of which has the arrangement shown in FIG. 1, connected in series is disposed in parallel, and each of the first and second optical systems includes a polarizing beam splitter. The polarizing beam splitter for the first optical system is designed to conduct one of the two polarized components to one of the isolator blocks and the other of the components to the other of the blocks, while that for the second optical system is constructed to be capable of combining the two polarized components traversing the optical isolator unit. Each polarizing beam splitter may be composed of a birefringent plate and also of the combination with reflecting plates. Further, the Faraday rotator may be designed for use in common with respect to an even number of optical isolator blocks disposed in parallel. This makes it possible to design more compactly the entire arrangement of the optical isolator.

According to yet another preferred formation of the present invention, the optical isolator unit is constructed so that an even number of optical isolator sets, each of which has the arrangement shown in FIG. 1, is disposed in series, and the first and second optical systems each comprise two optical members disposed in series and a polarizing rotator inserted only in the optical path of one of the polarized components.

According to a further preferred formation of the present invention, the optical isolator unit is constructed so that an odd number of optical isolator sets, each of which has the arrangement shown in FIG. 1, is disposed in series, the first optical system comprises a first optical member capable of splitting the incident light into two polarized components and the polarizing rotator inserted only in the optical path of one of the two polarized components, and the second optical system comprises two second optical members disposed in series so that the two polarized components passing through the optical isolator unit can be again synthesized and the polarizing rotator inserted only in the optical path of one of the two polarized components between the optical isolator unit and the second optical members.

According to yet a further formation of the present invention, the optical isolator unit is constructed so that an optical isolator set which has the arrangement shown in FIG. 1 is used or a plurality of optical isolator sets is connected in series, the first optical system comprises the first optical member capable of splitting the incident light into two polarized components and the polarizing rotator inserted only in the optical path of one of the two polarized components, and the second optical system comprises a first polarizing rotator inserted in common in respective optical paths of the two polarized components passing through the optical isolator unit, a second polarizing rotator inserted only in the optical path of one of the two polarized components, and the second optical member for synthesizing the two polarized components traversing the first and second polarizing rotators.

According to the present invention, the optical isolator can secure an extremely high effect of isolation as well as can effectively exert the function of the conventional optical isolator. Since the optical isolator according to the present invention can be constructed so that the conventional optical isolator is used as a unit by being combined into an optical isolator set or a plurality of optical isolator sets, it has the advantages that not only the fabrication can be made at a comparatively low cost, but easy replacement with the existing optical isolator can be performed. Furthermore, the optical isolator according to the present invention is such that incident light is made to coincide in optical axis with emergent light, so that it can be effectively utilized for spatial beam light and optical fibers and is of great worth in practical use.

This and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

Various embodiments of the optical isolator according to the present invention will be described below. In the figures showing respective embodiments, like numeral references are used in like optical elements and arrows indicate the directions of polarized light passing through the optical elements adjacent thereto.

FIRST EMBODIMENT

Figure 1:
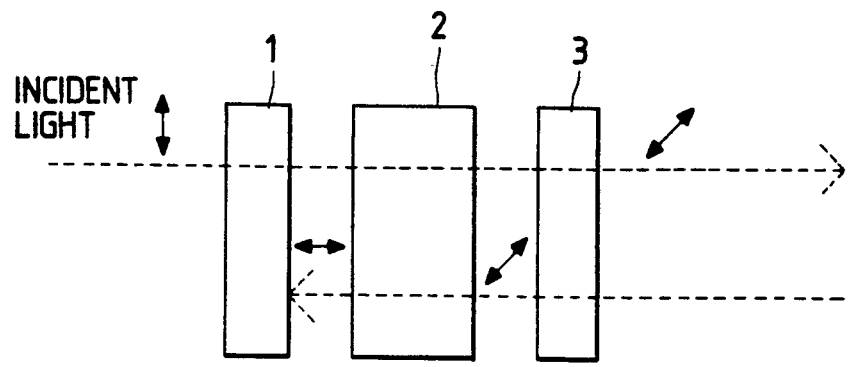
FIG. 1 is a view showing the arrangement of a conventional optical isolator.
Figure 2:
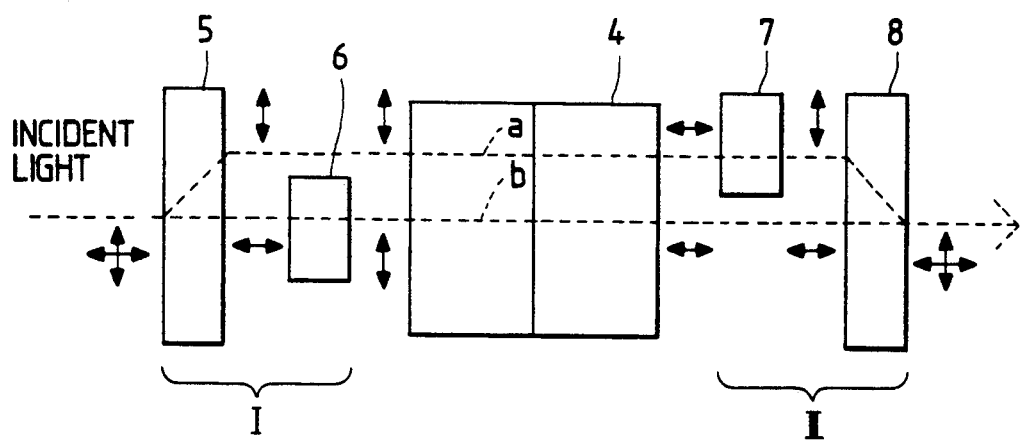
FIGS. 2 to 7 are views showing the arrangements of first to sixth embodiments according to the present invention, respectively.

In FIG. 2, reference numeral 4 represents an optical isolator unit comprising two optical isolators, each of which has the arrangement shown in FIG. 1, that is, two sets of optical isolator blocks, cemented in series, each including the first polarizer 1, the Faraday rotator 2, and the second polarizer 3. A first optical system I, which will be described later, is arranged on the front side of the optical isolator unit 4, namely, on the incidence side, and a second optical system II which will also be described later, on the emergence side. The first optical system I comprises an optical member 5, like a birefringent plate made of $TiO_2$ (rutile) for instance, capable of splitting incident light into two polarized components and also of synthesizing the two polarized components and a polarizing rotator 6, such as a half-wave plate by way of example, inserted only in an optical path b of one of the polarized components split by the optical member 5. The second optical system II, on the other hand, comprises a polarizing rotator 7, equivalent to the polarizing rotator 6, inserted only in an optical path a of the other of the polarized components which have traversed the optical isolator unit 4, and an optical member 8 equivalent to the optical member 5.

In this embodiment, the polarizing rotator 6 is arranged so that the plane of polarization of the polarized component split by the optical member 5 and traveling along the optical path b is rotated at an angle of 90° to coincide with that of the polarized component traveling along the optical path a. For the optical isolator unit 4, the polarizer 1 on the incidence side is disposed so that the plane of polarization coincides with those of the polarized components traveling along the optical paths a and b. Further, in the second optical system II, the polarizing rotator 7 and the optical member 8 are arranged so that the polarized components, after passage through the isolator unit 4, traveling along the optical paths a and b can be combined.

Next, reference is made to the function of the first embodiment.

As depicted in FIG. 2, when laser light emitted from the light source of the semiconductor laser, not shown, is incident on the optical member 5 from the left of the first optical system I, the incident light is split, by the optical member 5, into the polarized components of the planes of polarization making right angles with each other, which follow the optical paths a and b. For the polarized component traveling along the optical path b, the plane of polarization is further rotated at 90° by the polarizing rotator 6 to coincide with that of the polarized component traveling along the optical path a. The two polarized components traveling along the optical paths a and b are thus incident on the optical isolator unit 4 with the planes of polarization coincident with each other. The two polarized components, whose planes of polarization are both rotated at 90° in the optical isolator unit 4, enter the second optical system II. In the second optical system, the plane of polarization of the polarized component following the optical path a is rotated at 90° by the polarizing rotator 7. Consequently, the polarized components traveling along the optical paths a and b reach such a state that the planes of polarization intersect again at right angles, are again synthesized by the optical member 8, and emerge from the second optical system II.

On the other hand, the laser light incident on the optical member 8 from the right of the second optical system II is split, by the optical member 8, into the polarized components having the planes of polarization making right angles with each other, which travel leftward along the optical paths a and b and are incident on the optical isolator unit 4. Such polarized components, however, are blocked to travel by the behavior of the optical isolator unit 4 and hence cannot emerge therefrom toward the first optical system I.

Thus, according to the first embodiment, the performance of the optical isolator unit 4 can be effectively exerted.

SECOND EMBODIMENT

Figure 3:
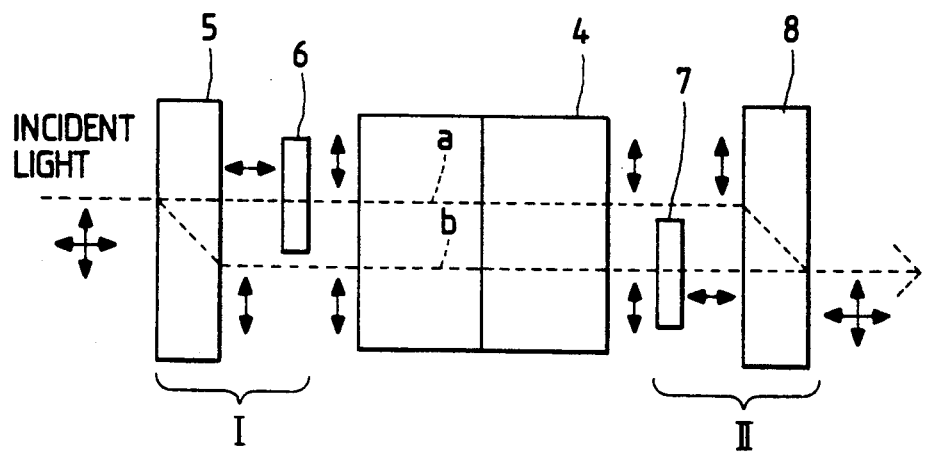

FIG. 3 shows the second embodiment of the present invention. This embodiment is different from the first embodiment in arrangement that the optical isolator unit 4 is constructed so that four sets of optical isolator blocks, each of which has the arrangement shown in FIG. 1, are connected in series and the plane of polarization on the incident side is equal to that on the emergence side. Hence, the second embodiment is identical in function with the first embodiment, except that the planes of polarization of the polarized components emerging from the optical isolator unit 4 are displaced by 90° compared with those of the first embodiment, so that a detailed description of the second embodiment is omitted. In the second embodiment also, the function of the optical isolator unit 4 can be effectively performed. Additionally, even though the optical paths a and b are replaced with each other, the same effect can be brought about. The same holds for the case where the optical isolator unit 4 is disposed in series as a plurality of optical isolator sets.

THIRD EMBODIMENT

Figure 4:
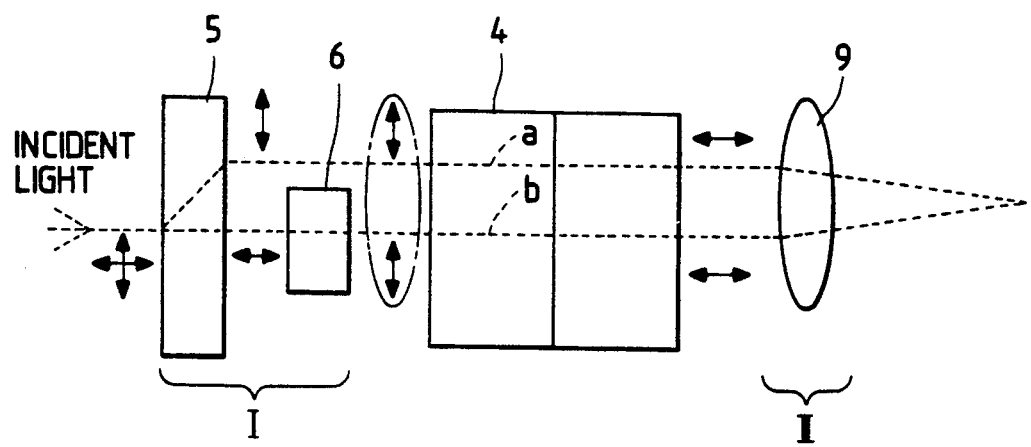

FIG. 4 depicts the third embodiment of the present invention. This embodiment is different from the first embodiment in arrangement that the second optical system II is composed of a condenser lens 9 for combining the polarized components traveling along the optical paths a and b. The third embodiment is characterized in that the polarized components compounded by the second optical system are the same in the planes of polarization. Although the description of the function thereof is omitted because it will be easily understood from that of the first embodiment, it should also be noted in this case that whenever the polarized light synthesized by the condenser lens 9 is reflected from, for example, the surface of an outer object, to enter the lens 9, the light is blocked within the optical isolator unit 4 and ceases to travel toward the first optical system.

Also, the third embodiment may well be constructed by replacing the optical paths a and b with each other. In such an instance, if the plane of polarization of the polarizer 1 on the incidence side of the optical isolator unit 4 is kept to coincide with that of the polarized component following the optical path b, the same effect as in the third embodiment can be secured. The arrangement may also be made such that the lens 9, as indicated by a chain line in FIG. 4, is disposed between the polarizer 6 and the optical isolator unit 4.

FOURTH EMBODIMENT

Figure 5:
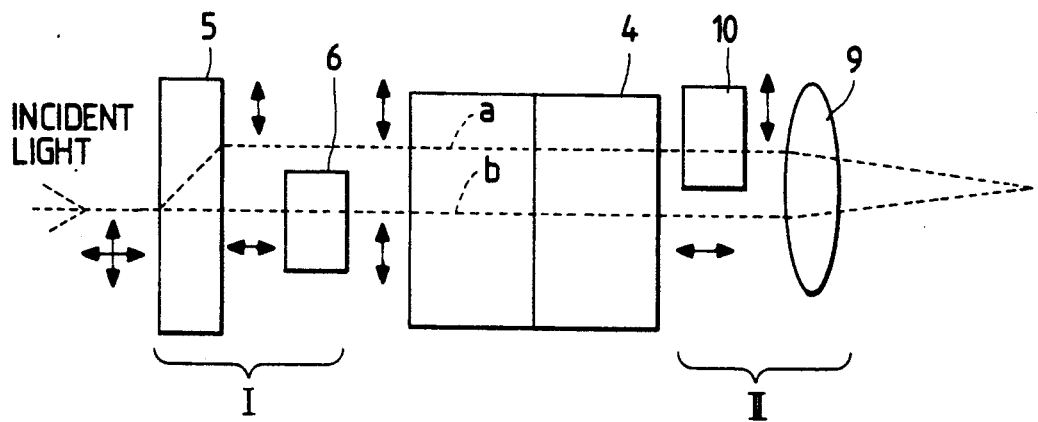

FIG. 5 shows the fourth embodiment of the present invention. This embodiment is distinguished from the third embodiment by the arrangement that between the optical isolator unit 4 and the condenser lens 9, a polarizing rotator 10 is disposed which can turn, at 90°, the plane of polarization of the polarized component traveling along the optical path a (which may also be the optical path b). Since, however, the function and effect of the fourth embodiment are identical with those of the third embodiment, the description thereof is left out.

FIFTH EMBODIMENT

Figure 6:
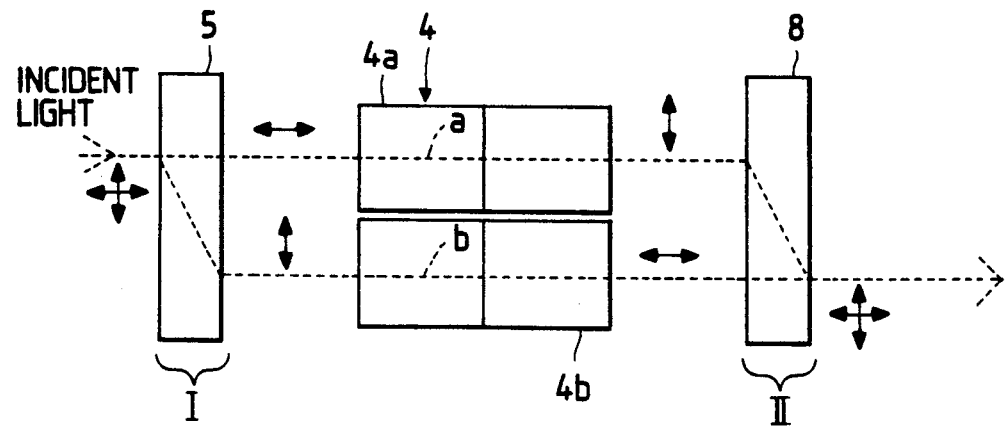

FIG. 6 shows the fifth embodiment of the present invention. This embodiment is different from the second embodiment (FIG. 3) in arrangement that the optical isolator unit 4 comprises an optical isolator group 4a disposed on the optical path a and formed by connecting two sets of optical isolator blocks, each of which has the arrangement shown in FIG. 1, in series, and an optical isolator group 4b disposed on the optical path b and formed similar to the optical isolator group 4a, and that the first optical system I includes only the optical member 5 and the second optical system II only the optical member 8. In this case, the arrangement is made such that the planes of polarization of the first polarizers 1 of the optical isolator groups 4a and 4b make right angles with each other.

Hence, the polarized components of the incident light split by the optical member 5 travel along the optical paths a and b and pass through the optical isolator groups 4a and 4b, respectively. In this case, the planes of polarization of the first polarizers on the incidence side of the optical isolator groups 4a and 4b coincide individually with those of the polarized components incident thereon, so that the polarized components traversing the two optical isolator groups are again combined by the optical member 8. However, light traveling in a direction opposite to the incident light, although it is split into two polarized components by the optical member 8, is blocked by the optical isolator groups 4a and 4b and fails to reach the optical member 5.

SIXTH EMBODIMENT

Figure 7:
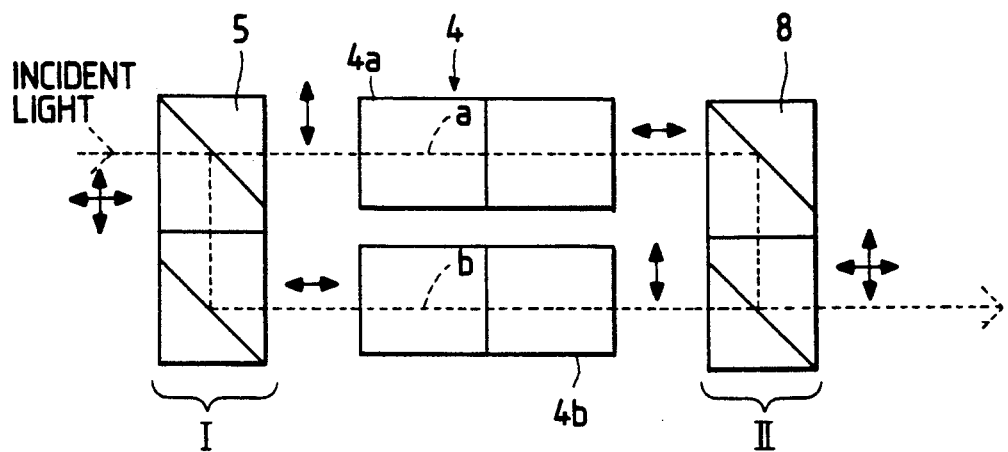

FIG. 7 shows the sixth embodiment of the present invention. This embodiment differs from the fifth embodiment in arrangement that each of the optical members 5 and 8 is constructed by combining two polarizing beam splitters. Since the function and effect of the sixth embodiment are substantially the same as those of the fifth embodiment, the description thereof is omitted. Also, the optical members 5 and 8 can be constructed by each combining the polarizing beam splitters with the reflecting plates.

Figure 8:
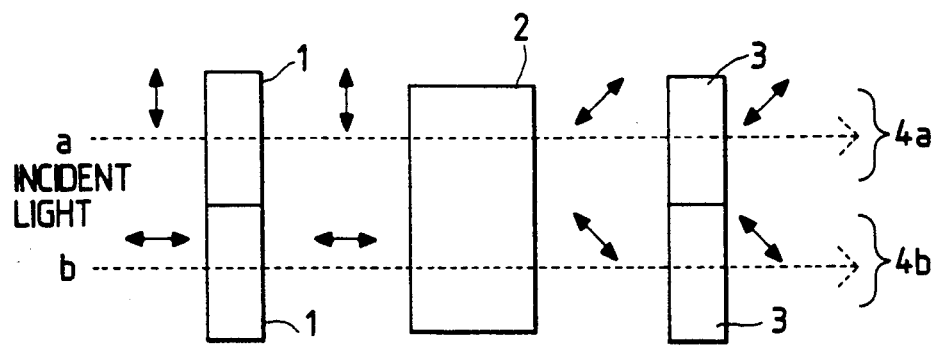
FIG. 8 is a view showing an example of the arrangement of an optical isolator unit to be incorporated in the fifth and sixth embodiments.

Although, in the fifth and sixth embodiments, the optical isolator groups 4a and 4b constituting the optical isolator unit 4 each include the first polarizer 1, the Faraday rotator 2, and the second polarizer 3, for example, as shown in FIG. 8, the Faraday rotator 2 can be used in common. This enables the optical isolator unit 4 to be compactly designed.

SEVENTH EMBODIMENT

Figure 9:
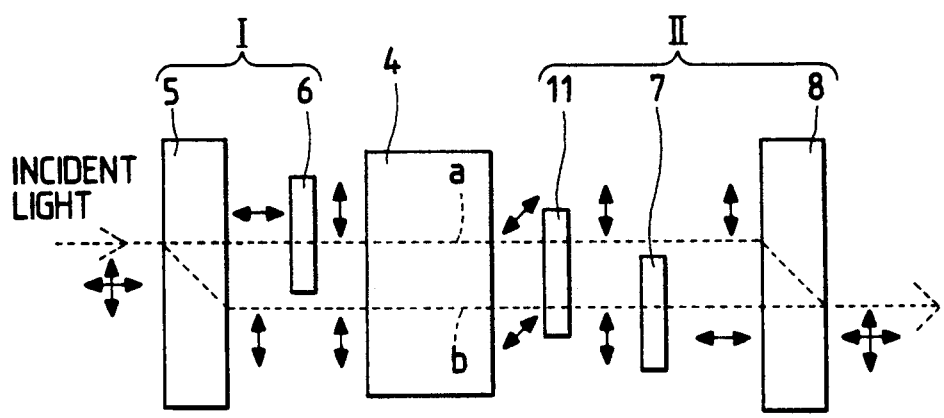
FIGS. 9 to 12 are views showing the arrangements of seventh to tenth embodiments according to the present invention; respectively.

FIG. 9 illustrates the seventh embodiment of the present invention. This embodiment is different from the second embodiment (FIG. 3) in arrangement that the optical isolator unit 4 is constructed by connecting an odd number of optical isolator block sets, each of which has the arrangement shown in FIG. 1, in series, and that the second optical system II includes a polarizing rotator 11 composed of, for example, a half-wave plate, inserted in common with the optical paths a and b between the optical isolator unit 4 and the polarizing rotator 7.

In the seventh embodiment, whenever the two polarized components split by the first optical system I travel through the optical isolator unit 4, both the planes of polarization are rotated at 45°, 135°, 225°, or 315° and returned, through the polarizing rotator 11, to a polarizing state before the components are incident on the optical isolator unit 4. Since other functions and effects of the seventh embodiment are the same as those of the second embodiment, a detailed description thereof is omitted.

EIGHTH EMBODIMENT

Figure 10:
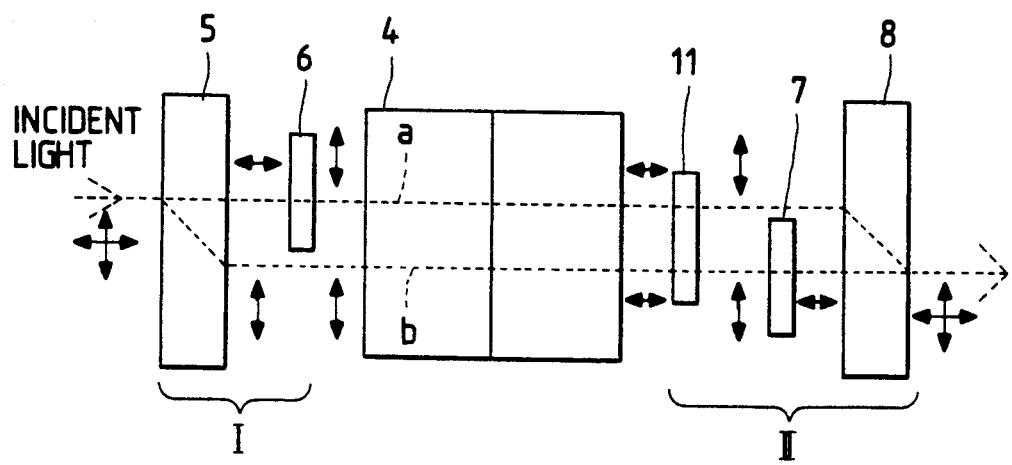

FIG. 10 depicts the eighth embodiment of the present invention. This embodiment is distinguished from the seventh embodiment by the arrangement that the optical isolator unit 4 is constructed by connecting an even number of optical isolator block sets, each of which has the arrangement shown in FIG. 1, in series, and the two polarized components traveling along the optical paths a and b through the optical isolator unit 4 are rotated 90°, together with the planes of polarization thereof. The fundamental function and effect of the eighth embodiment, however, are identical with those of the second embodiment and as such a detailed description thereof is left out.

NINTH EMBODIMENT

Figure 11:
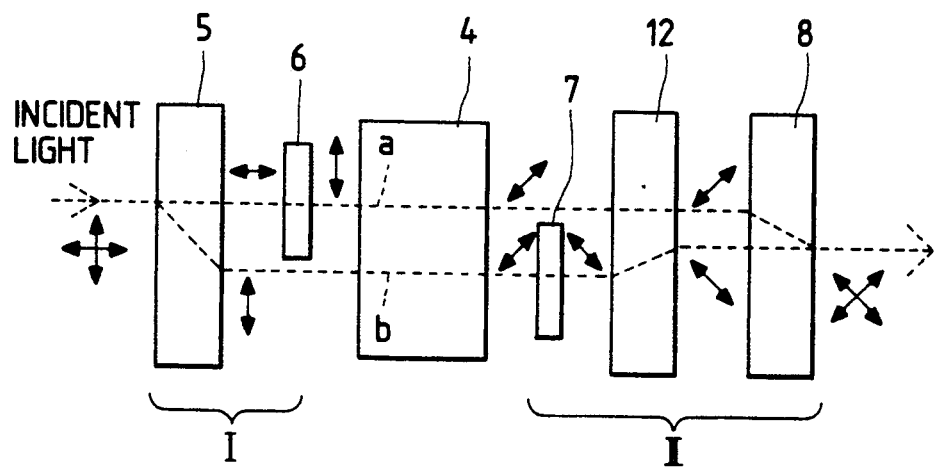

FIG. 11 shows the ninth embodiment of the present invention. This embodiment is different from the eight embodiment in arrangement that an optical member 12, in place of the polarizing rotator 11, similar to the optical member 8 is disposed in common with the optical paths a and b between the polarizing rotator 7 and the optical member 8, and the planes of polarization of the polarized components of the incident light make right angles with those of the emergent light from the optical member 8.

In the ninth embodiment also, the substantial function and effect are the same as those of the above-mentioned embodiments, so that a detailed description thereof is omitted. Even though the optical paths a and b are replaced with each other, the function and effect will remain unchanged.

TENTH EMBODIMENT

Figure 12:
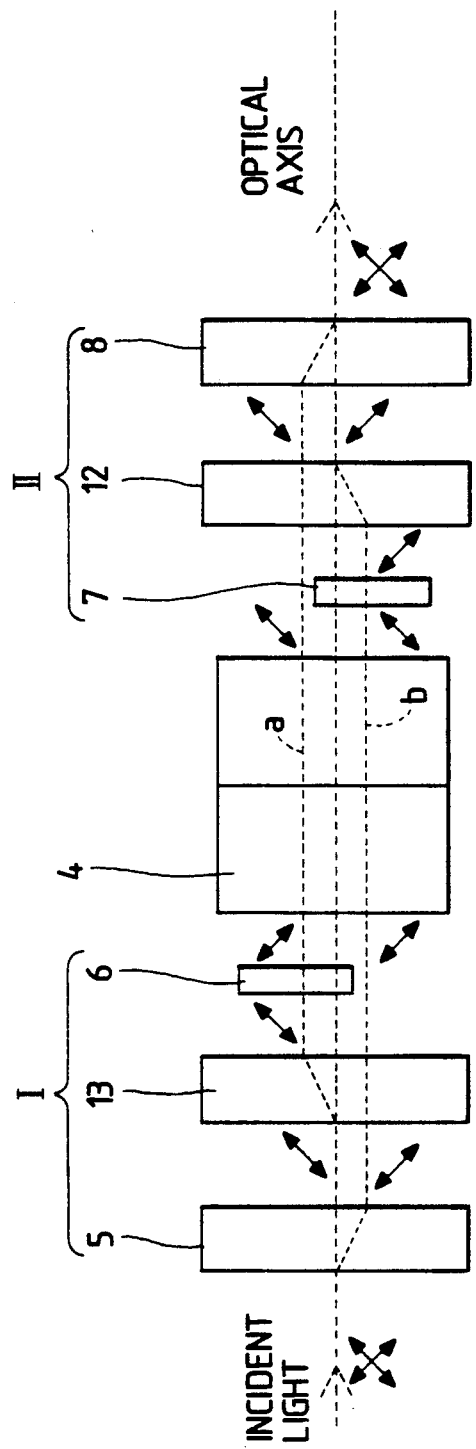

FIG. 12 shows the tenth embodiment of the present invention. This embodiment is different from the ninth embodiment in arrangement that the optical isolator unit 4 is constructed by connecting an even number of optical isolator block sets, each of which has the arrangement shown in FIG. 1, in series, and that in the first optical system I, an optical member 13 similar to the optical member 5 is disposed in common with the optical paths a and b between the optical member 5 and the polarizing rotator 6.

In the tenth embodiment also, the substantial function and effect are the same as those of the above-mentioned embodiments, so that a detailed description thereof is omitted. Even though the optical paths a and b are replaced with each other, the function and effect will remain unchanged.

As will be apparent from respective embodiments stated above, according to the present invention, a light transmission system that cannot previously specify the plane of polarization of the incident light can also be constructed so that the plane of polarization of the incident light coincides with that of the polarizer on the incidence side of the optical isolator unit, thereby allowing an excellent effect of isolation without considering the plane of polarization of the incident light.

What is claimed is:

1. An optical isolator comprising:
   an optical isolator unit having a structure depending on a plane of polarization of incident light;
   a first optical system disposed on an incidence side of said optical isolator unit, for splitting the incident light into two polarized components so that the plane of polarization of one of said two polarized components is rotated to coincide with the plane of polarization of a polarizer provided on the incidence side of said optical isolator unit and so that said two polarized components are incident on said optical isolator unit with planes of polarization of said two polarized components coincident with the plane of polarization of said polarizer on the incidence side of said optical isolator unit; and
   a second optical system disposed on an emergence side of said optical isolator unit, for combining said two polarized components emerging from said optical isolator unit into emergent light.

2. The optical isolator according to claim 1, wherein said optical isolator unit is constructed by connecting an even number of optical isolator block sets, in series, each comprising a first polarizer, a Faraday rotator, and a second polarizer disposed in order from the incidence side to the emergence side, said first optical system comprises a first optical member for splitting the incident light into the polarized components having planes of polarization perpendicular to each other to form two optical paths and a first polarizing rotator disposed on one of said two optical paths between said first optical member and said optical isolator unit, and said second optical system comprises a second polarizing rotator disposed on the other of said two optical paths on the emergence side of said optical isolator unit and a second optical member disposed on the emergence side of said second polarizing rotator, for combining said two optical paths.

3. The optical isolator according to claim 2, wherein each of said first optical member and said second optical member comprises a birefringent plate, and each of said first polarizing rotator and said second polarizing rotator comprises a half-wave plate.

4. The optical isolator according to claim 2, wherein each of said first and second optical systems includes a pair of birefringent plates disposed in spaced relation and each of said first and second polarizing rotators includes a half-wave plate.

5. The optical isolator according to claim 1, wherein said optical isolator unit is constructed so that the plane of polarization on the incidence side makes an angle of 90° with that on the emergence side.

6. The optical isolator according to claim 1, wherein said optical isolator unit is constructed so that the plane of polarization on the incidence side coincides with that on the emergence side.

7. The optical isolator according to claim 1, wherein said optical isolator unit is constructed by connecting a plurality of optical isolator block sets, in series, each comprising a first polarizer, a Faraday rotator, and a second polarizer disposed in order from the incidence side to the emergence side, said first optical system comprises an optical member for splitting the incident light into the polarized components having planes of polarization perpendicular to each other to form two optical paths and a polarizing rotator disposed on one of said two optical paths between said optical member and said optical isolator unit, and said second optical system comprises lens means for combining said two optical paths.

8. The optical isolator according to claim 1, wherein said optical isolator unit is constructed by connecting a plurality of optical isolator block sets, in series, each comprising a first polarizer, a Faraday rotator, and a second polarizer disposed in order from the incidence side to the emergence side, said first optical system comprises an optical member for splitting the incident light into the polarized components having planes of polarization perpendicular to each other to form two optical paths and a first polarizing rotator disposed on one of said two optical paths between said optical member and said optical isolator unit, and said second optical system comprises a second polarizing rotator disposed on one of said two optical paths on the emergence side of said optical isolator unit and lens means disposed on the emergence side of said second polarizing rotator, for combining said two optical paths.

9. The optical isolator according to claim 8, wherein said optical member comprises a birefringent plate, and said first polarizing rotator and said second polarizing rotator each comprise a half-wave plate.

10. The optical isolator according to claim 1, wherein said optical isolator unit is constructed by connecting an odd number of optical isolator block sets, in series, each comprising a first polarizer, a Faraday rotator, and a second polarizer disposed in order from the incidence side to the emergence side, said first optical system comprises a first optical member for splitting the incident light into the polarized components having planes of polarization perpendicular to each other to form two optical paths and a first polarizing rotator disposed on one of said two optical paths between said first optical member and said optical isolator unit, and said second optical system comprises a second polarizing rotator disposed in common with said two optical paths on the emergence side of said optical isolator unit, a third polarizing rotator disposed on one of said two optical paths on the emergence side of said second polarizing rotator, and a second optical member disposed on the emergence side of said third polarizing rotator, for combining said two optical paths.

11. The optical isolator according to claim 1, wherein said optical isolator unit is constructed by connecting an even number of optical isolator block sets, in series, each comprising a first polarizer, a Faraday rotator, and a second polarizer disposed in order from the incidence side to the emergence side, said first optical system comprises a first optical member for splitting the incident light into the polarized components having planes of polarization perpendicular to each other to form two optical paths and a first polarizing rotator disposed on one of said two optical paths between said first optical member and said optical isolator unit, and said second optical system comprises a second polarizing rotator disposed in common with said two optical paths on the emergence side of said optical isolator unit, a third polarizing rotator disposed on one of said two optical paths on the emergence side of said second polarizing rotator, and a second optical member disposed on the emergence side of said third polarizing rotator, for combining said two optical paths.

12. The optical isolator according to claims 10 or 11, wherein each of said first and second optical members includes a birefringent plate and each of said first, second, and third polarizing rotators includes a half-wave plate.

13. The optical isolator according to claim 1, wherein said optical isolator unit is constructed by connecting an odd number of optical isolator block sets, in series, each comprising a first polarizer, a Faraday rotator, and a second polarizer disposed in order from the incidence side to the emergence side, said first optical system comprises a first optical member for splitting the incident light into the polarized components having planes of polarization perpendicular to each other to form two optical paths and a first polarizing rotator disposed on one of said two optical paths between said first optical member and said optical isolator unit, and said second optical system comprises a second polarizing rotator disposed on one of said two optical paths on the emergence side of said optical isolator unit and second and third optical members disposed in common with said two optical paths on the emergence side of said second polarizing rotator, for combining said two optical paths.

14. The optical isolator according to claim 13, wherein each of said first, second, and third optical members includes a birefringent plate and each of said first and second polarizing rotators includes a half-wave plate.

15. An optical isolator comprising:
an optical isolator unit having a structure depending on a plane of polarization of incident light;
a first optical system disposed on an incidence side of said optical isolator unit, for splitting the incident light into two polarized components so that the plane of polarization of one of said two polarized components is rotated to coincide with the plane of polarization of a polarizer provided on the incidence side of said optical isolator unit and so that said two polarized components are incident on said optical isolator unit with planes of polarization of said two polarized components coincident with the plane of polarization of said polarizer on the incidence side of said optical isolator unit; and
a second optical system disposed between said optical isolator unit and said first optical system, for combining said two polarized components.

16. An optical isolator comprising:
an optical isolator unit composed of an even number of optical isolator groups juxtaposed, having a structure depending on a plane of polarization of incident light;
a first optical system disposed on an incidence side of said optical isolator unit, for splitting the incident light into two polarized components so that the planes of polarization of said two polarized components coincide with the planes of polarization of polarizers included on the incidence side of said two optical isolator groups and so that said two polarized components are incident on said optical isolator groups, respectively; and
a second optical system disposed on an emergence side of said optical isolator unit, for combining said two polarized components emerging from said optical isolator groups.

17. The optical isolator according to claim 16, wherein each of said optical isolator groups is constructed by connecting an even number of optical isolator block sets, in series, each including a first polarizer, a Faraday rotator, and a second polarizer disposed in order from the incidence side to the emergence side and each of said first optical system and said second optical system includes two polarizing beam splitters combined with each other.

18. The optical isolator according to claim 16, wherein each of said optical isolator groups is constructed by connecting an even number of optical isolator block sets, in series, each including a first polarizer, a Faraday rotator, and a second polarizer disposed in order from the incidence side to the emergence side and each of said first optical system and said second optical system includes a birefringent plate.

19. The optical isolator according to claim 16, wherein each of said first and second optical systems includes a combination of polarizing beam splitters with reflecting plates.

* * * * *